2 Sheets—Sheet 1.

J. M. PFAUDLER,

Assignor of a part to E. J. KELSEY, J. SULLIVAN, and J. SARGENT.

APPARATUS FOR REGULATING THE PRESSURE IN A SERIES OF FERMENTING VESSELS.

No. 10,284. Reissued Feb. 6, 1883.

Chas. J. Buchheit
Edw. J. Brady
} Witnesses—

J. M. Pfaudler, Inventor
By Wilhelm & Brown
Attorneys.

2 Sheets—Sheet 2.

J. M. PFAUDLER,

Assignor of a part to E. J. KELSEY, J. SULLIVAN, and J. SARGENT.

APPARATUS FOR REGULATING THE PRESSURE IN A SERIES OF FERMENTING VESSELS.

No. 10,284. Reissued Feb. 6, 1883.

Chas. J. Buchheit
Edw. J. Brady } Witnesses

J. M. Pfaudler Inventor.
By Wilhelm Pierrus
Attorneys

UNITED STATES PATENT OFFICE.

JOHN M. PFAUDLER, OF ROCHESTER, NEW YORK, ASSIGNOR OF A PART TO EDWARD J. KELSEY, JOSIAH SULLIVAN, AND JAMES SARGENT, ALL OF SAME PLACE.

APPARATUS FOR REGULATING THE PRESSURE IN A SERIES OF FERMENTING-VESSELS.

SPECIFICATION forming part of Reissued Letters Patent No. 10,284, dated February 6, 1883.

Original No. 205,572, dated July 2, 1878. Application for reissue filed August 26, 1879.

DIVISION A.

*To all whom it may concern:*

Be it known that I, JOHN M. PFAUDLER, of Rochester, in the county of Monroe and State of New York, have invented a new and Improved Pressure-Regulator for Fermenting Liquids, of which the following is a specification.

Figure 1:
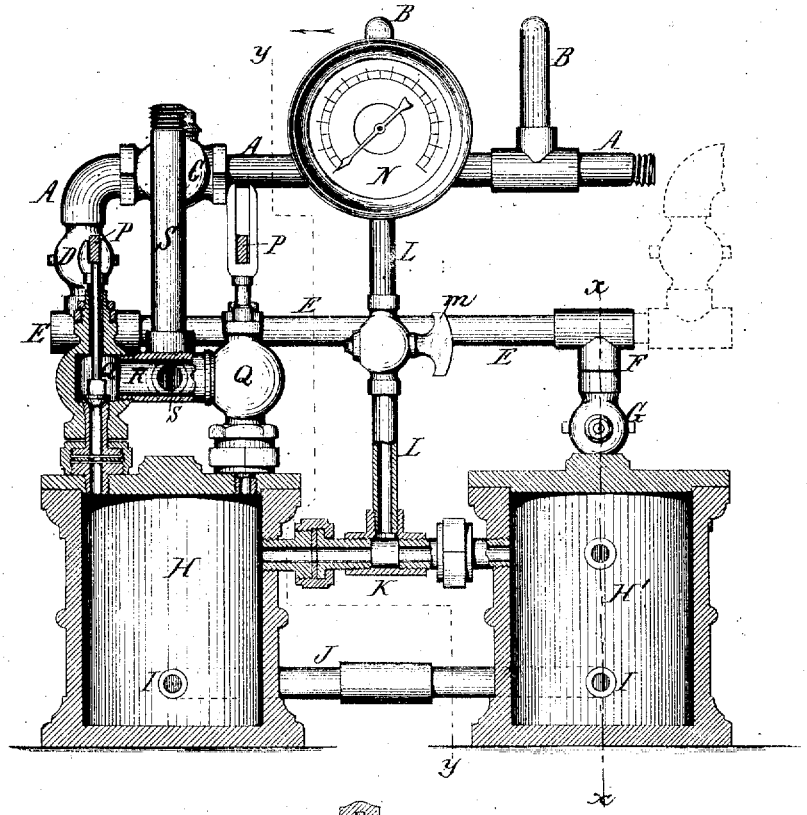
Figure 2:
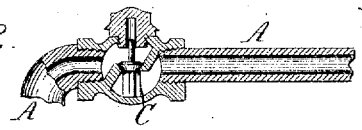
Figure 3:
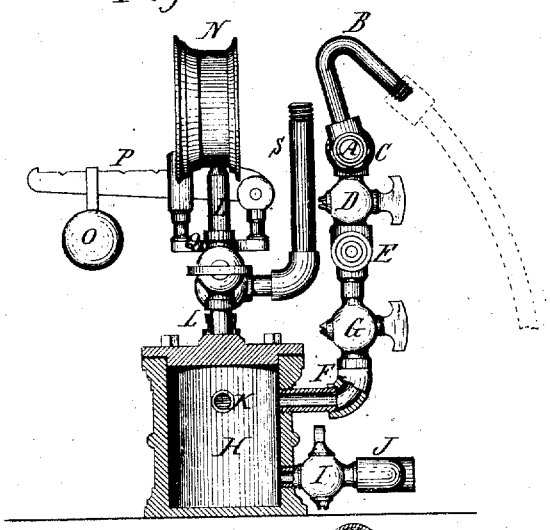
Figure 4:
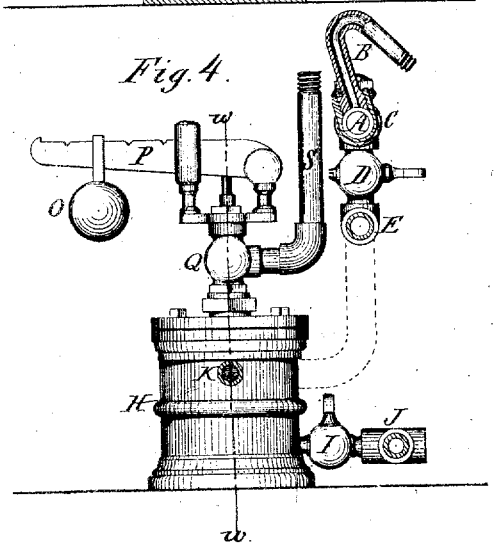

Figure 1, Sheet 1, represents a partly-sectional front or side elevation of my improved pressure-regulator, the section being taken on the line *w w* of Fig. 4, Sheet 2. Fig. 2, Sheet 1, is a detail section of the check-valve in one of the section-pipes. Fig. 3, Sheet 2, is an end elevation of the pressure-regulator, partly seen in section on the line *x x* of Fig 1. Fig. 4 is a vertical cross-section of the same, taken on the line *y y* of Fig. 1.

Similar letters of reference indicate corresponding parts.

The invention has for its object to provide an effective apparatus for equalizing the pressure in a series of hogsheads or other vessels containing beer, wines, or other liquids in a state of fermentation, and for regulating the pressure of the gas caused by such fermentation, so that it shall not exceed a certain number of pounds to the square inch, previously determined and gaged in the said apparatus.

The invention consists in the combination of one or more section pipes or passages, each having branch pipes connecting it with one or more fermentation-vessels, and a check-valve and a stop-cock, with a main pipe connected by branch pipes and stop-cocks to intercommunicating cylinders or receivers provided or connected with pressure-gage, safety-valve, and blow-off cocks, as will be hereinafter described and claimed.

A is one of the section-pipes, of which there are one or any number, according to the number of hogsheads or other vessels required to be in operation at the same time. The said vessels are arranged in sections of a certain number—say six—and each connected by a hose to one of the branch pipes B of their common section pipe or conduit A. The latter are attached to one common main pipe, E, and each of them is provided with a stop-cock, D, for shutting off communication with the main pipe E in case of leakage in the fermenting-vessels of that section, or when attaching their hose to the pipes B, or for other purposes. Between the cock D and the pipe B nearest to it the section pipe or conduit is provided with a check-valve, C, which opens when the pressure in the fermenting-vessels preponderates and allows the gas to pass off into the main pipe, E, but closes in the opposite direction—that is, against a preponderating counter-pressure in the main pipe E. The main E carries off the surplus gas from the several sections to one or more cylinders or receivers, H, by means of one or more branch pipes, F, each of which is provided with a stop-cock, G. The cylinders H have blow-off cocks I at the bottom, which cocks may be connected to a common discharge-pipe, J, and opened to cleanse the cylinders of any sediment which may have been carried over into the cylinders by a sudden rush of gas from extraordinary fermentation in any of the sections. Communication is kept up between the upper part of the cylinders H by the pipe K, which is connected by a pipe, L, having a stop-cock, M, to a manometer, N, or pressure-gage, indicating in numbers of pounds to the square inch the pressure of the gas in the cylinders.

The pressure (generally five or six pounds) at which it is desired to carry on the fermentation is gaged and regulated by sliding the weight O on the lever P of the safety-valve Q nearer to or farther from its fulcrum, to correspond with the position of the index of the manometer N at the number on the scale at which it is intended that the valve should open and let out the surplus gas. The manometer N may be dispensed with and the pressure adjusted and read off on a scale graduated upon the lever P directly. The safety-valve is attached on top of the cylinder, and, to guard against the valve getting out of order, two or more safety-valves are used, as shown in the drawings. When using two valves Q they are preferably connected together by a pipe, R, to discharge through a common exhaust-pipe, S. The fermentation-vessels of each section, being all connected by hose to the branch pipes B, and by the latter to their common section-pipe or conduit A, without intermediate valves, it is evident that the pressure in them all is equalized by the free access of the gas from one to the other, thus preventing the liability of either of them to burst from overpressure, and when the gas has accumulated sufficiently to overcome the resisting pressure, the check-valve C will open and the surplus of gas pass to the main pipe E, and thence to the cylinders H, where it is stored up until sufficient pressure is attained to raise the safety-valves Q and allow the surplus to escape through the exhaust R S.

By this invention the fermentation can thus be kept at a uniform pressure to insure beer of uniform quality, and the hogsheads or other vessels need not be subjected to any more strain than what is necessary to insure the said uniformity.

I am aware of an English patent to Youil, No. 1,957, of September 8, 1854, in which a series of tunning-casks are provided with a chest above them for permitting an escape of gas, with or without pressure, and preventing the admission of air. In that device each cask is connected to double liquid-passages passing through the bung of the cask—one for incessant filling up, thus keeping the tunning-casks always full. The other is for the purpose of conducting the barm as it forms from the fermenting mass into the chamber above. Such a construction keeps the contents of the cask in a state of constant agitation. The casks are not only entirely full, but the chamber above is also partially filled, so as to act to incessantly fill the casks below as the barm boils out. The casks being full, there is no opportunity for a free access of the gas from one vessel to another throughout the series, as in my case. I would have it understood that I distinctly disclaim such a construction and mode of operation.

Having thus described my invention, what I claim is—

1. Apparatus for equalizing and limiting the pressure of gas in a series of closed fermenting-vessels and permitting free access of the gas from one vessel to another throughout the series, consisting of separate gas-conduits for each vessel, constructed, substantially as described, to tap the gas-space of each vessel, a common closed conduit with which all said vessel-conduits communicate, and a pressure-regulator governing the escape of gas from such common conduit whenever the pressure shall exceed a previously-determined limit.

2. Apparatus for equalizing, limiting, and indicating the pressure in a series of closed fermenting-vessels and permitting a free access of the gas from one vessel to another throughout the series, consisting of separate gas-conduits for each vessel, constructed, substantially as described, to tap the gas-space of each vessel, a common closed conduit into which said vessel-conduits lead, a pressure-regulator constructed to permit an escape of gas from said common conduit whenever the pressure shall have reached a previously-determined limit, and a pressure-indicating gage.

3. In apparatus for limiting and equalizing the pressure of gas in a series consisting of two or more sections of closed fermenting-vessels, and permitting a free access of the gas from one vessel to another throughout the series, separate gas-conduits for each vessel, a common conduit for each section with which the vessel-conduits in that section communicate, and check-valves, as described, located in the common conduits, said valves arranged to open by internal pressure and close by pressure in the opposite direction.

4. In apparatus for equalizing the pressure of gas in a series of closed fermenting-vessels arranged in sections, and permitting a free access of the gas from one vessel to another throughout the series, the combination, with the vessel-conduits, the common conduits belonging to each section, a common receiver with which said common conduits communicate, and check-valves, as described, of a pressure-regulator communicating with said receiver, whereby an escape of gas is permitted when the pressure shall have reached a limit determined by the regulator.

5. In apparatus for equalizing the pressure of gas in a series of closed fermenting-vessels, the combination, with the common conduit, of separate gas-conduits for each vessel, said vessel-conduits between the vessels and the common conduit being elevated to a level above the point of their union with the said common conduit, whereby back-drip therefrom is avoided.

6. A gas-receiver provided with one or more safety-valves and apparatus for gaging the pressure, and in communication with said receiver a series of vessel-conduits for permitting a free access of gas from one vessel to another throughout a series of closed fermenting-vessels, each conduit constructed to connect with the gas-space of its vessel.

7. In apparatus for equalizing the pressure of gas in a series of closed fermenting-vessels and permitting a free access of the gas from one vessel to another throughout the series, separate conduits for each vessel, a common gas-receiver with which said vessel-conduits communicate, a pressure-regulator governing an escape-orifice, whereby gas in excess of a fixed limit of pressure is permitted to escape, and in connection with said escape-orifice a conduit for carrying away the said escaping gas, substantially as described.

JOHN M. PFAUDLER.

Witnesses:
EDWARD WILHELM,
JNO. J. BONNER.